(12) United States Patent
Mitani et al.

(10) Patent No.: US 9,950,601 B2
(45) Date of Patent: Apr. 24, 2018

(54) VEHICLE WITH HIGH VOLTAGE EQUIPMENT ARRANGED BEHIND SEAT

(71) Applicant: HONDA MOTOR CO., LTD., Tokyo (JP)

(72) Inventors: Manabu Mitani, Wako (JP); Koichi Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/296,046

(22) Filed: Oct. 18, 2016

(65) Prior Publication Data

US 2017/0106735 A1 Apr. 20, 2017

(30) Foreign Application Priority Data

Oct. 20, 2015 (JP) .................................. 2015-206585

(51) Int. Cl.
*B60R 16/04* (2006.01)
*B60K 1/04* (2006.01)
(Continued)

(52) U.S. Cl.
CPC ............ *B60K 1/04* (2013.01); *B60L 11/1877* (2013.01); *B60L 11/1879* (2013.01); *B60L 15/007* (2013.01); *B60K 2001/005* (2013.01); *B60K 2001/0405* (2013.01); *B60K 2001/0416* (2013.01); *B60Y 2200/90* (2013.01); *B60Y 2200/92* (2013.01); *B60Y 2306/01* (2013.01);
(Continued)

(58) Field of Classification Search
CPC .... B60K 1/04; B60K 1/00; B60K 2001/0422; B60K 2001/005; B60K 2001/0416; B60K 2001/0433; B60K 2001/0427; B60K 6/28; B60K 6/22; B60L 15/007; B60L 11/1877; B60L 11/1851; B60L 11/18; B60L 11/00
See application file for complete search history.

(56) References Cited

U.S. PATENT DOCUMENTS 7,004,274 B2 * 2/2006 Shibasawa .......... H01M 2/1083
180/68.5
7,419,209 B1 * 9/2008 Mangiapane ...... B60H 1/00278
180/65.1
(Continued)

FOREIGN PATENT DOCUMENTS

JP 3571704 B2 10/2003
JP 2005-112284 4/2005

*Primary Examiner* — James M Dolak
(74) *Attorney, Agent, or Firm* — Mori & Ward, LLP

(57) ABSTRACT

A vehicle includes an upper member, a lower member, and a high voltage equipment. The upper member is provided at a rear of a seat in a front-rear direction of the vehicle. The upper member extends in a vehicle width direction of the vehicle. The lower member extends in the vehicle width direction. The lower member is provided at the rear of the seat in the front-rear direction below the upper member in a vehicle height direction of the vehicle. The high voltage equipment is provided at the rear of the seat in the front-rear direction and connected to an upper connecting point of the upper member and a lower connecting point of the lower member. A virtual line connecting the upper connecting point and the lower connecting point passes through a center of gravity of the high voltage equipment viewed in the vehicle width direction.

12 Claims, 7 Drawing Sheets

(51) Int. Cl.
*B60L 11/18* (2006.01)
*B60L 15/00* (2006.01)
*B60K 1/00* (2006.01)

(52) U.S. Cl.
CPC ......... *B60Y 2410/10* (2013.01); *Y02T 10/645* (2013.01); *Y02T 10/7005* (2013.01); *Y02T 10/705* (2013.01); *Y10S 903/907* (2013.01)

(56) References Cited

U.S. PATENT DOCUMENTS

| | | | | |
|---|---|---|---|---|
| 7,503,585 | B2* | 3/2009 | Hashimura | B60K 15/063 280/124.109 |
| 8,584,779 | B2* | 11/2013 | Tsuchiya | B60K 1/04 180/68.5 |
| 8,602,091 | B2* | 12/2013 | Nemoto | B60H 1/00278 165/202 |
| 8,708,079 | B2* | 4/2014 | Hashimura | B62D 25/2027 180/311 |
| 8,717,761 | B2* | 5/2014 | Aoki | B60K 1/04 165/104.33 |
| 9,174,520 | B2* | 11/2015 | Katayama | B60K 1/04 |
| 9,758,194 | B2* | 9/2017 | Inagaki | B60K 1/04 |
| 9,783,037 | B2* | 10/2017 | Muto | B60K 1/04 |
| 9,812,746 | B2* | 11/2017 | Katayama | B60K 1/04 |
| 2007/0238015 | A1* | 10/2007 | Kubota | H01M 10/4207 429/120 |
| 2012/0181827 | A1* | 7/2012 | Aoki | B60K 1/04 297/217.3 |
| 2013/0330587 | A1* | 12/2013 | Takahashi | H01M 2/1077 429/99 |

\* cited by examiner

VEHICLE WITH HIGH VOLTAGE EQUIPMENT ARRANGED BEHIND SEAT

CROSS-REFERENCE TO RELATED APPLICATIONS

The present application claims priority under 35 U.S.C. § 119 to Japanese Patent Application No. 2015-206585, filed Oct. 20, 2015. The contents of this application are incorporated herein by reference in their entirety.

BACKGROUND OF THE INVENTION

Field of the Invention
The present invention relates to a vehicle.
Discussion of the Background
High voltage equipment including a battery (high voltage battery), a DC-DC converter, and an inverter is installed in vehicles such as an electric vehicle and a hybrid vehicle. For example, Patent Japanese Patent Application Publication No. 2005-112284 and Japanese Patent No. 3571704 disclose vehicles in which high voltage equipment is arranged behind a seat.

The vehicle of Patent Japanese Patent Application Publication No. 2005-112284 includes a special unit frame for supporting high voltage equipment. The high voltage equipment is supported firmly by connecting a lower part of the unit frame to a lower member arranged in a lower part behind the seat, and connecting both right and left sides of an upper part of the unit frame to right and left wheelhouse panels. However, a special unit frame hinders weight and cost reduction of the vehicle.

Meanwhile, the vehicle of Patent Japanese Patent No. 3571704 includes an upper member arranged in an upper part behind the seat and a lower member arranged in a lower part behind the seat, and the high voltage equipment is fastened to the upper member and the lower member. This type of high voltage equipment-fixing structure allows the high voltage equipment to be supported at both ends in the vertical direction by the upper member and the lower member, so that the need of a special unit frame as in Patent Japanese Patent Application Publication No. 2005-112284 can be eliminated.

SUMMARY OF THE INVENTION

According to one aspect of the present invention, a vehicle in which high voltage equipment is arranged behind a seat, includes an upper member and a lower member. The upper member is arranged in an upper part behind the seat. The upper member extends in the vehicle width direction. The lower member is arranged in a lower part behind the seat. The lower member extends in the vehicle width direction. The high voltage equipment is fastened to the upper member at an upper fastening point, and is fastened to the lower member at a lower fastening point. A virtual line connecting the upper fastening point and the lower fastening point in side view passes through the center of gravity of the high voltage equipment.

According to another aspect of the present invention, a vehicle includes an upper member, a lower member, and a high voltage equipment. The upper member is provided at a rear of a seat in a front-rear direction of the vehicle. The upper member extends in a vehicle width direction of the vehicle perpendicular to the front-rear direction. The lower member extends in the vehicle width direction. The lower member is provided at the rear of the seat in the front-rear direction below the upper member in a vehicle height direction of the vehicle perpendicular to the front-rear direction and the vehicle width direction. The high voltage equipment is provided at the rear of the seat in the front-rear direction and connected to an upper connecting point of the upper member and a lower connecting point of the lower member. A virtual line connecting the upper connecting point and the lower connecting point passes through a center of gravity of the high voltage equipment viewed in the vehicle width direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
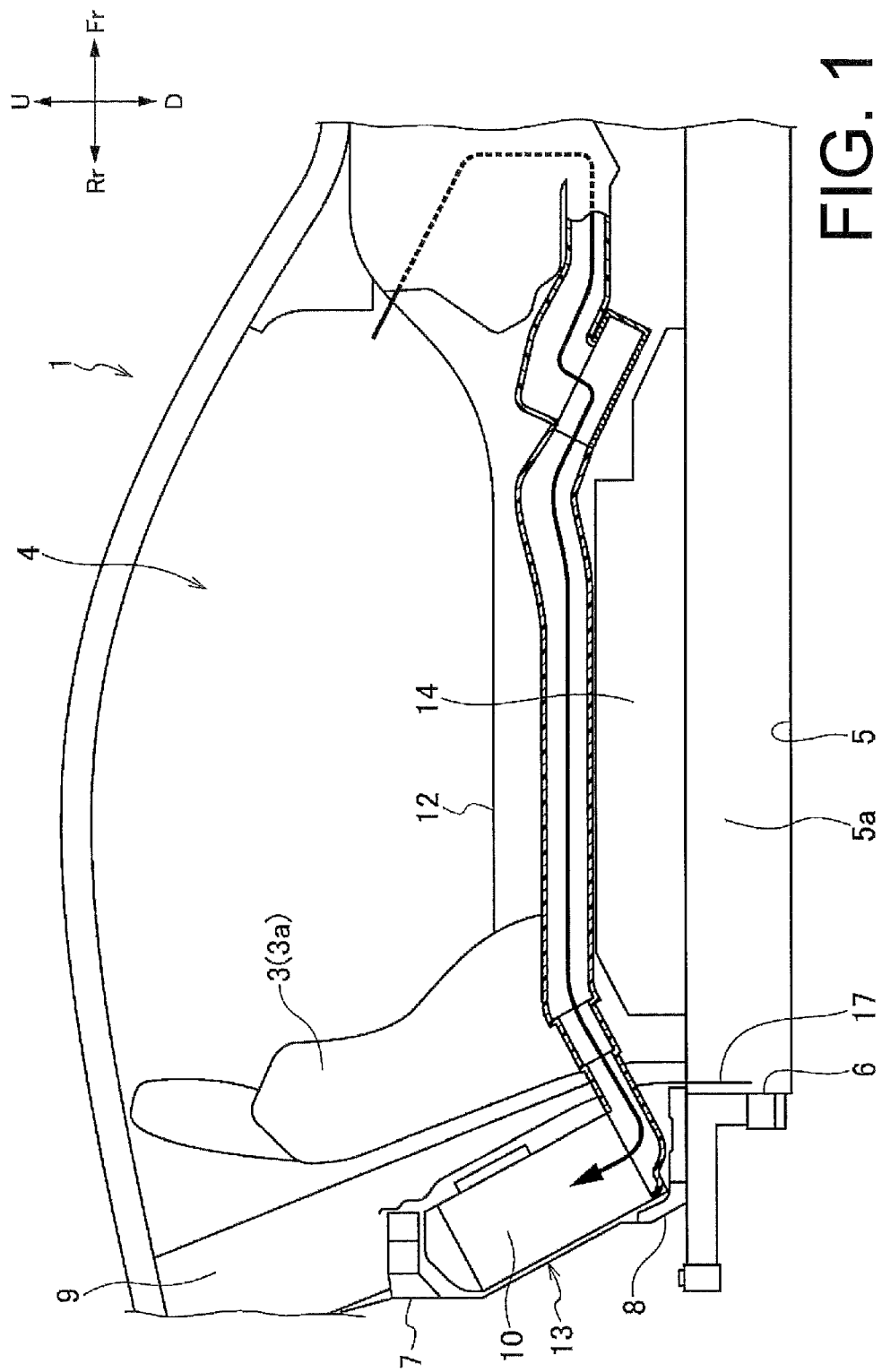
FIG. 1 is a schematic right side view of the interior of a vehicle according to an embodiment of the present invention.

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

[Vehicle]

Figure 2:
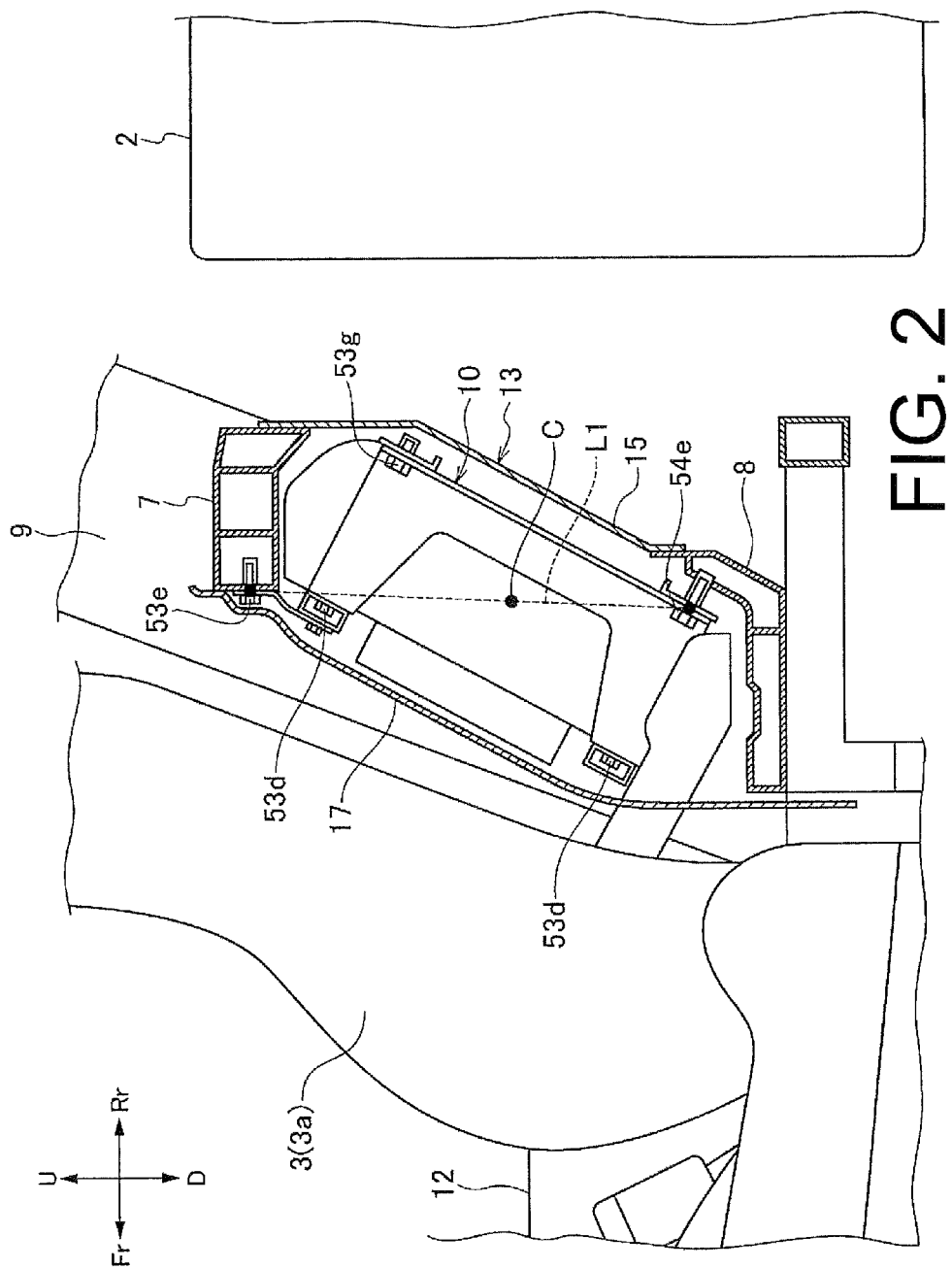
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle inside 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-Accommodation Portion]

Figure 3:
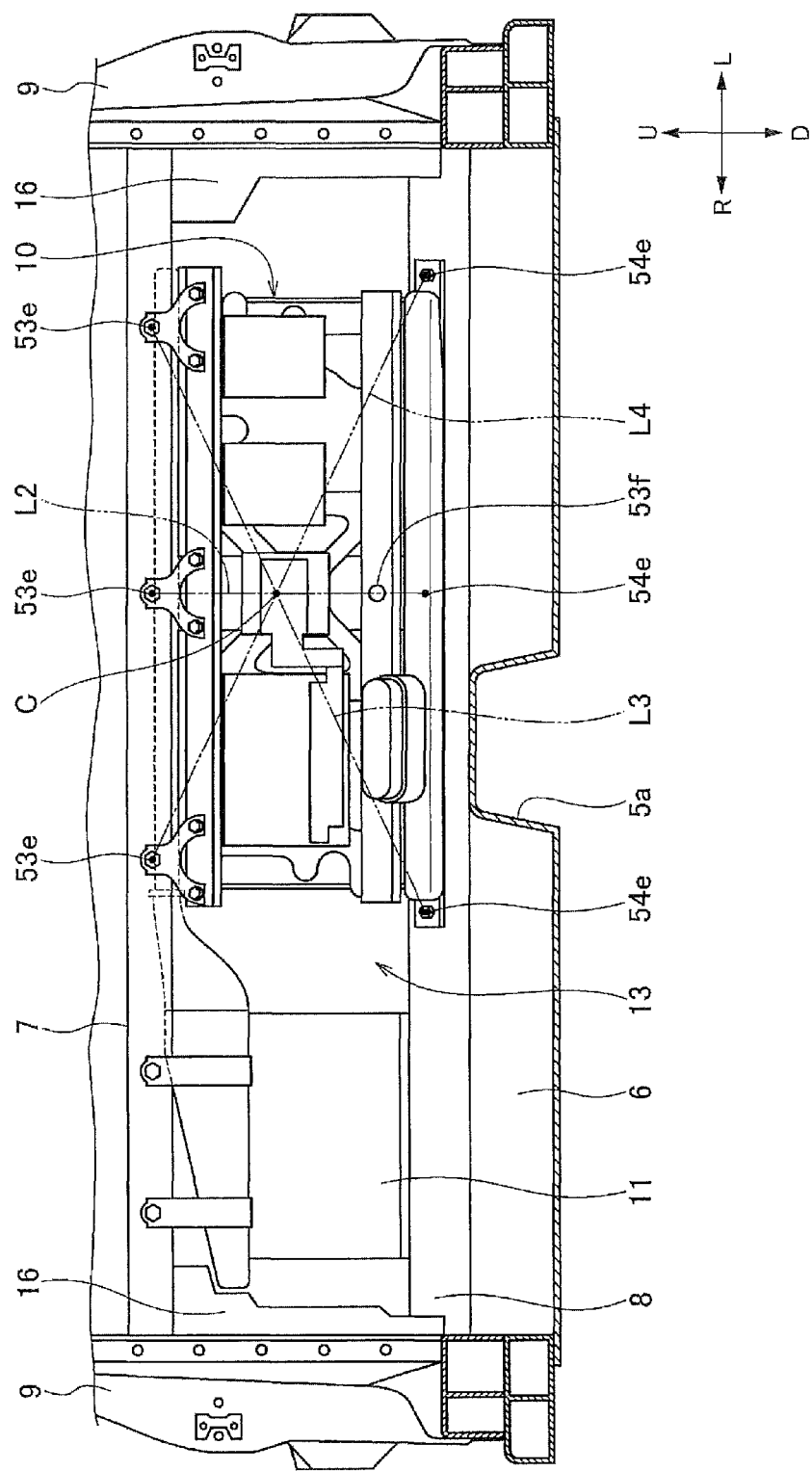
FIG. 3 is a front view of a high voltage equipment-accommodation portion in which a battery unit is arranged.
Figure 7:
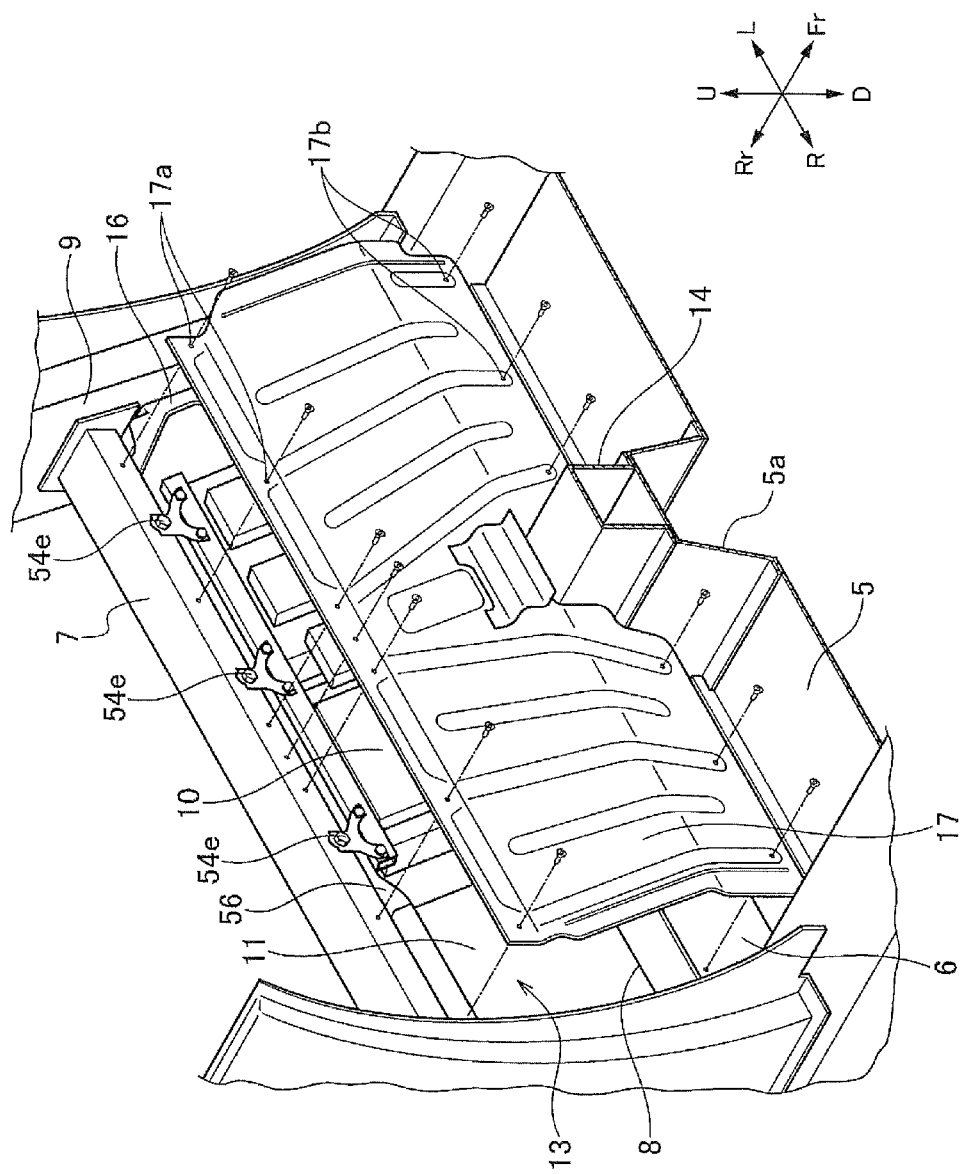
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8.

[High Voltage Equipment]

The vehicle 1 is provided with the battery unit 10 consisting of a high voltage battery, as high voltage equipment. As mentioned above, the battery unit 10 is accommodated, together with the DC-DC converter 11, in the high voltage equipment-accommodation portion 13 provided behind the seats 3.

Figure 4:
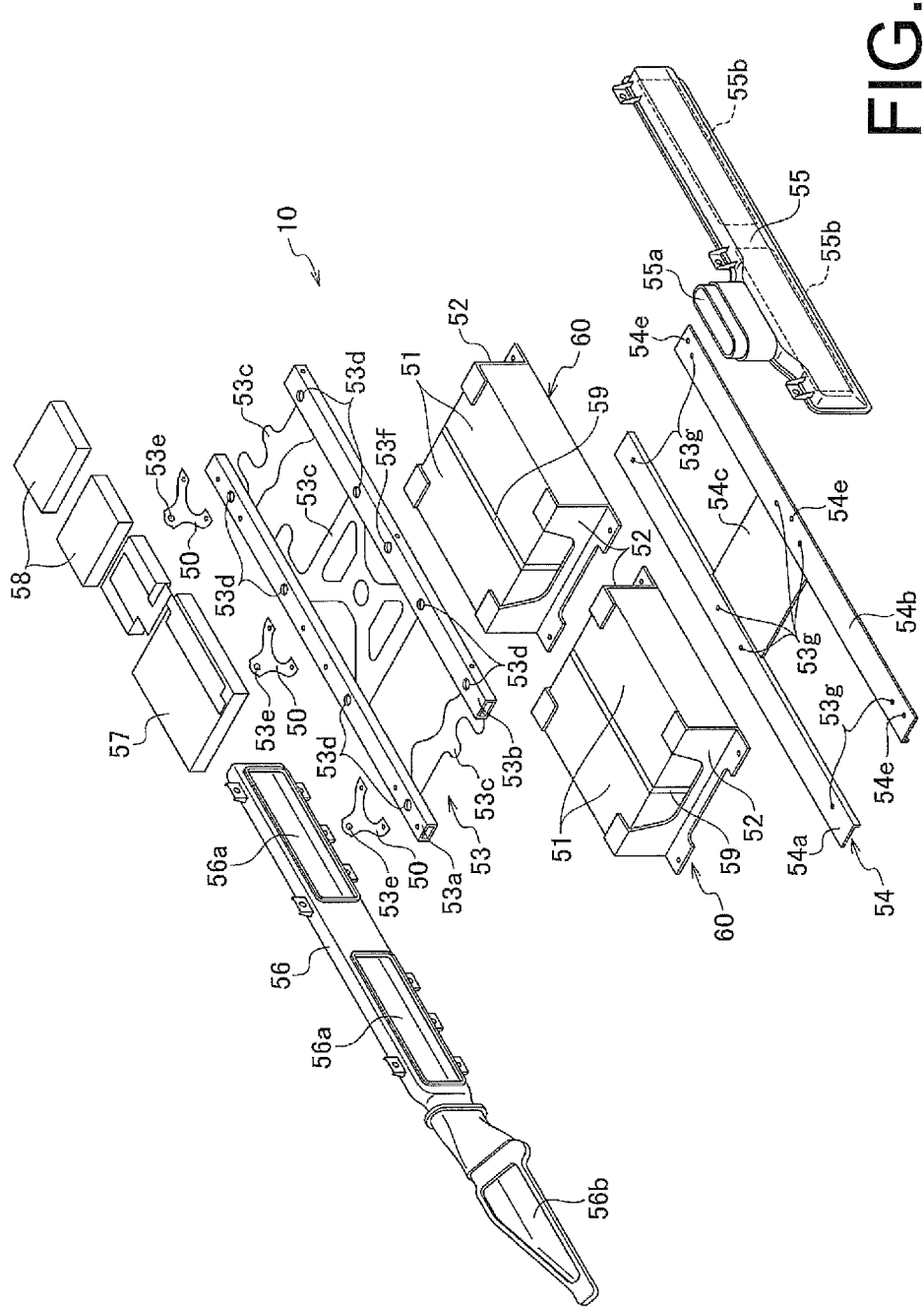
FIG. 4 is an exploded perspective view of the battery unit.
Figure 5:
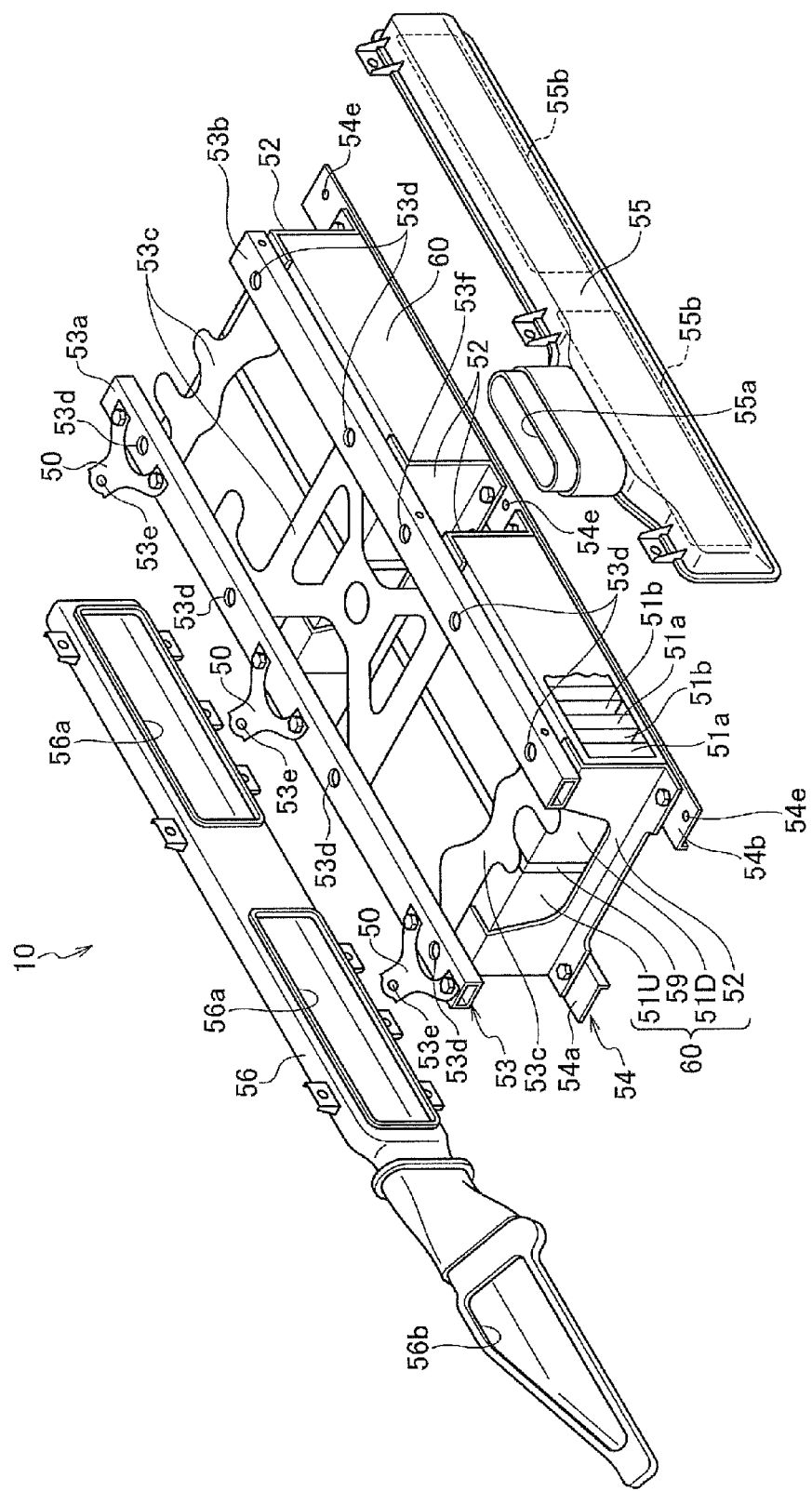
FIG. 5 is an exploded perspective view of the battery unit in which only ducts are disassembled.
Figure 6:
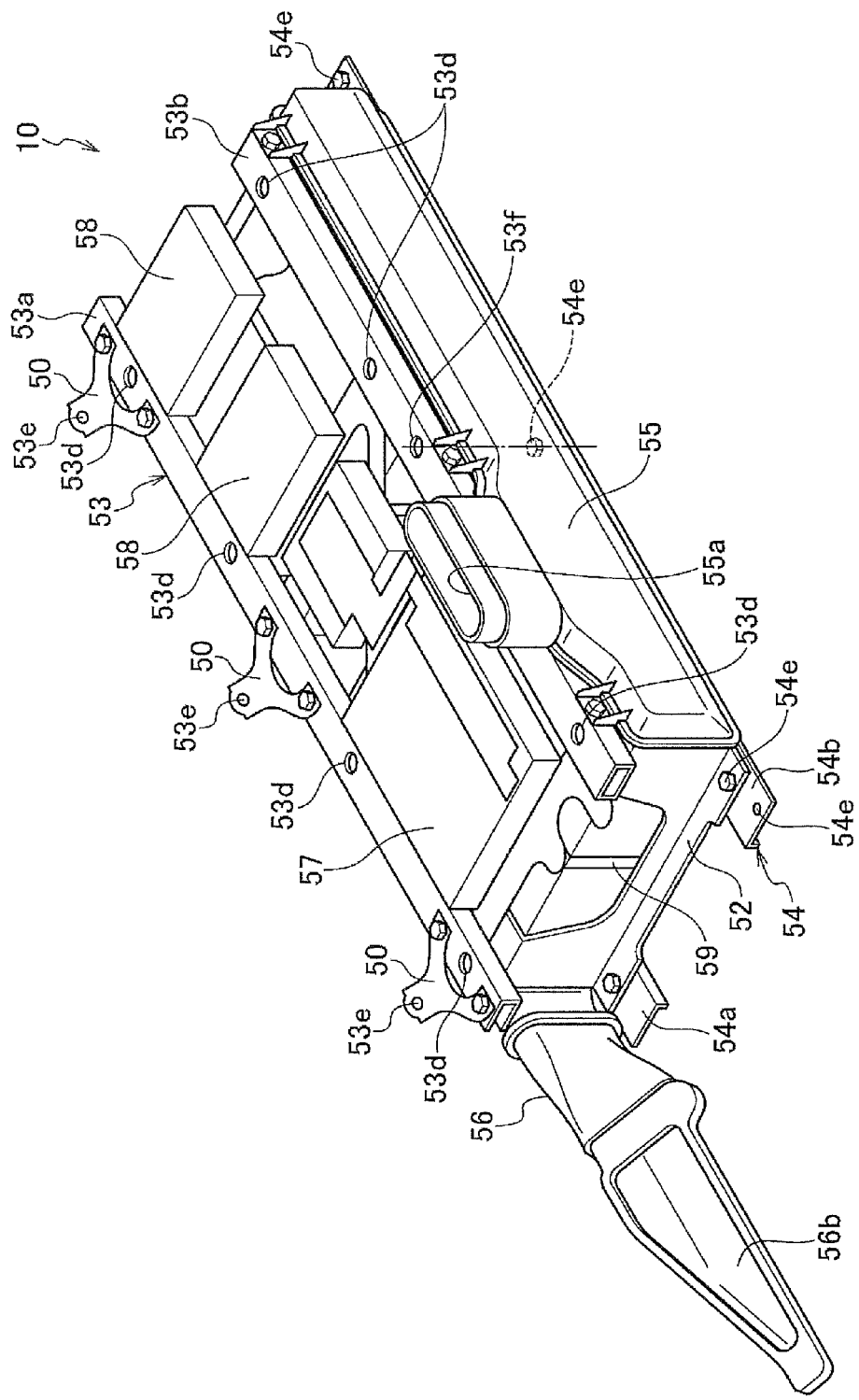
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 that prevents leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point (or an upper connecting point) 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points (or three lower connecting points) 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D. Note that in the embodiment, cooling air having passed through an air conditioning system of the vehicle 1 is transmitted to the inlet duct 55 of the battery unit 10, through a supply duct provided inside the center console 12.

The exhaust duct 56 includes; two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points (or upper connecting points) 53e of the front frame 53 are fastened to the upper member 7 with bolts, and the lower fastening points (or lower connecting points) 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8.

As mentioned above, the battery unit 10 accommodated in the high voltage equipment-accommodation portion 13 provided behind the seat 3 is tilted rearward along the back 3a of the seat 3 in side view, while its upper part is fastened to the upper member 7 through multiple upper fastening points 53e, and its lower part is fastened to the lower member 8 through multiple lower fastening points 54e. Accordingly, the upper member 7 and the lower member 8 support the battery unit 10 at both ends in the vertical direction.

[Layout of Fastening Point]

As shown in FIG. 2, a virtual line L1 connecting the upper fastening point 53e and the lower fastening point 54e in side view passes through a center of gravity C of the battery unit 10. This allows the upper member 7 and the lower member 8 to support the center of the battery unit 10 in the longitudinal direction, so that load on the battery unit 10 at the front of the virtual line L1 and load on the battery unit 10 at the rear of the virtual line L1 are substantially equivalent.

Although the virtual line L1 connecting the upper fastening point 53e and the lower fastening point 54e in side view may be tilted frontward or rearward, it is preferable that the virtual line extend along a substantially vertical direction as in the embodiment. This allows the direction of a vector occurring from self weight of the battery unit 10 to substantially coincide with the direction of the virtual line L1, so that moment load acting on the upper fastening point 53e and the lower fastening point 54e can be reduced.

Moreover, as shown in FIG. 3, the multiple upper fastening points 53e and the multiple lower fastening points 54e are preferably arranged symmetrically about the center of gravity C of the battery unit 10, in front view. In the embodiment including three upper fastening points 53e and three lower fastening points 54e, positions of the multiple upper fastening points 53e and multiple lower fastening points 54e are set, such that all of virtual lines L2, L3, and L4 pass through the center of gravity C, the virtual line L2 connecting the upper fastening point 53e and lower fastening point 54e at the center in the lateral direction in front view, the virtual line L3 connecting the upper fastening point 53e on the left and lower fastening point 54e on the right in the lateral direction in front view, and the virtual line L4 connecting the upper fastening point 53e on the right and lower fastening point 54e on the left in the lateral direction in front view.

As has been described, according to the vehicle 1 of the embodiment, when fastening the battery unit 10 to the upper member 7 and the lower member 8, the virtual line L1 connecting the upper fastening point 53e and the lower fastening point 54e in side view passes through the center of gravity C of the battery unit 10. Hence, the battery unit 10 can be supported evenly in the longitudinal direction. As a result, load acting on the supporting part of the battery unit 10 due to acceleration and deceleration of the vehicle, vibration of the vehicle body, and other causes can be made smaller than when supporting the battery unit 10 at only one end in the longitudinal direction.

Also, since the virtual line L1 extends along a substantially vertical direction, moment load acting on the supporting part of the battery unit 10 can be reduced.

Also, the multiple upper fastening points 53e and the multiple lower fastening points 54e are arranged symmetrically about the center of gravity C of the battery unit 10, in front view. Hence, the battery unit 10 can be supported evenly in the lateral direction as well.

Also, the battery unit 10 is tilted rearward along the back 3a of the seat 3 in side view. Hence, the operation range (front-rear slidable range and reclinable range) of the movable seat can be increased without extending the longitudinal length of the vehicle 1, whereby comfort of the occupant can be improved.

Note that the present invention is not limited to the embodiment described above, and may be modified or improved, for example, as is appropriate.

For example, while the embodiment uses the battery unit as an example of high voltage equipment to which the present invention is applied, the high voltage equipment to which the present invention is applied may be any one of a battery unit, a DC-DC converter, and an inverter, or a combination of two or more of these devices. Also, the battery does not necessarily have to be unitized.

A vehicle (e.g. the vehicle 1 of the embodiment) in which high voltage equipment (e.g. the battery unit 10 of the embodiment) is arranged behind a seat (e.g. the seats 3 of the embodiment), includes: an upper member (e.g. the upper member 7 of the embodiment) arranged in an upper part behind the seat, and extending in the vehicle width direction; and a lower member (e.g. the lower member 8 of the embodiment) arranged in a lower part behind the seat, and extending in the vehicle width direction. The high voltage equipment is fastened to the upper member at an upper fastening point (e.g. the upper fastening points 53e of the embodiment), and is fastened to the lower member at a lower fastening point (e.g. the lower fastening points 54e of the embodiment). A virtual line (e.g. the virtual line L1 of the embodiment) connecting the upper fastening point and the lower fastening point in side view passes through the center of gravity (e.g. the center of gravity C of the embodiment) of the high voltage equipment.

The virtual line extends along a substantially vertical direction.

The high voltage equipment is fastened to the upper member at multiple upper fastening points, and is fastened to the lower member at multiple lower fastening points. The multiple upper fastening points and the multiple lower fastening points are arranged symmetrically about the center of gravity of the high voltage equipment, in front view.

The high voltage equipment is tilted rearward along a back (e.g. the back 3a of the embodiment) of the seat in side view.

[Effect]

When fastening the high voltage equipment to the upper member and the lower member, the virtual line connecting the upper fastening point and the lower fastening point in side view passes through the center of gravity of the high voltage equipment. Hence, the high voltage equipment can be supported evenly in the longitudinal direction. As a result, load acting on the supporting part of the high voltage equipment due to acceleration and deceleration of the vehicle, vibration of the vehicle body, and other causes can be made smaller than when supporting the high voltage equipment at only one end in the longitudinal direction.

Also, since the virtual line extends along a substantially vertical direction, moment load acting on the supporting part of the high voltage equipment can be reduced.

Also, the multiple upper fastening points and the multiple lower fastening points are arranged symmetrically about the center of gravity of the high voltage equipment, in front view. Hence, the high voltage equipment can be supported evenly in the lateral direction as well.

Also, the high voltage equipment is tilted rearward along the back of the seat in side view. Hence, the operation range (front-rear slidable range and reclinable range) of the movable seat can be increased without extending the longitudinal length of the vehicle, whereby comfort of the occupant can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle in which high voltage equipment is arranged behind a seat, comprising:
   a high voltage equipment-accommodation portion in which said high voltage equipment is accommodated;
   an upper member arranged in an upper part of said high voltage equipment-accommodation portion behind said seat in a front-rear direction of the vehicle, and extending in a vehicle width direction; and
   a lower member arranged in a lower part of said high voltage equipment-accommodation portion behind said seat, and extending in the vehicle width direction, wherein:
   said high voltage equipment is fastened to said upper member at an upper fastening point, and is fastened to said lower member at a lower fastening point in the lower part of said high voltage equipment-accommodation portion; and
   said upper fastening point and said lower fastening point are aligned with each other and with a center of gravity of said high voltage equipment along a virtual line when viewed from the vehicle width direction.

2. The vehicle according to claim 1, wherein said virtual line extends along a vertical direction.

3. The vehicle according to claim 1, wherein:
   said high voltage equipment is fastened to said upper member at a plurality of upper fastening points including said upper fastening point, and is fastened to said lower member at a plurality of lower fastening points including said lower fastening point; and
   said upper fastening points and said lower fastening points are arranged symmetrically about the center of gravity of said high voltage equipment, when viewed from a front of the vehicle.

4. The vehicle according to claim 1, wherein said high voltage equipment is tilted rearward along a back of said seat when viewed from the vehicle width direction.

5. A vehicle comprising:
   a high voltage equipment-accommodation portion in which high voltage equipment is accommodated;
   an upper member arranged in an upper part of the high voltage equipment-accommodation portion provided at a rear of a seat in a front-rear direction of the vehicle and extending in a vehicle width direction of the vehicle perpendicular to the front-rear direction; and
   a lower member arranged in a lower part of the high voltage equipment-accommodation portion extending in the vehicle width direction and provided at the rear of the seat in the front-rear direction below the upper member in a vehicle height direction of the vehicle perpendicular to the front-rear direction and the vehicle width direction,
   the high voltage equipment being provided at the rear of the seat in the front-rear direction and connected to an upper connecting point of the upper member and a lower connecting point of the lower member, the upper connecting point and the lower connecting point being aligned with each other and with a center of gravity of the high voltage equipment along a virtual line when viewed from the vehicle width direction.

6. The vehicle according to claim 5, wherein the virtual line extends along the vehicle height direction.

7. The vehicle according to claim 5, wherein
   the high voltage equipment is connected to the upper member at a plurality of upper connecting points including the upper connecting point, and is connected to the lower member at a plurality of lower connecting points including the lower connecting point, and
   the upper connecting points and the lower connecting points are arranged symmetrically about the center of gravity of the high voltage equipment when viewed from a front of the vehicle.

8. The vehicle according to claim 5, wherein the high voltage equipment is tilted rearward along a back of the seat when viewed from the vehicle width direction.

9. The vehicle according to claim 1, further comprising:
   a first fastener that connects said lower member to a frame of said high voltage equipment, said lower fastening point being provided at said first fastener; and
   a second fastener that extends from said upper member, said upper fastening point being provided at said second fastener.

10. The vehicle according to claim 1, further comprising a protection cover that covers a front of the high voltage equipment-accommodation portion, wherein
    said upper fastening point and said lower fastening point are spaced apart from the protection cover in the front-rear direction.

11. The vehicle according to claim 5, further comprising:
    a first fastener that connects the lower member to a frame of the high voltage equipment, the lower fastening point being provided at the first fastener; and
    a second fastener that extends from the upper member, the upper fastening point being provided at the second fastener.

12. The vehicle according to claim 5, further comprising a protection cover that covers a front of the high voltage equipment-accommodation portion, wherein the upper fastening point and the lower fastening point are spaced apart from the protection cover in the front-rear direction.

\* \* \* \* \*